US 11,831,257 B2

(12) United States Patent
Tanaka et al.

(10) Patent No.: US 11,831,257 B2
(45) Date of Patent: Nov. 28, 2023

(54) POWER GENERATION DEVICE AND POWER GENERATION METHOD

(71) Applicant: RIKEN, Saitama (JP)

(72) Inventors: Yo Tanaka, Saitama (JP); Yaxiaer Yalikun, Saitama (JP); Satoshi Amaya, Saitama (JP)

(73) Assignee: RIKEN, Saitama (JP)

( * ) Notice: Subject to any disclaimer, the term of this patent is extended or adjusted under 35 U.S.C. 154(b) by 806 days.

(21) Appl. No.: 16/962,132

(22) PCT Filed: Jan. 17, 2019

(86) PCT No.: PCT/JP2019/001360
§ 371 (c)(1),
(2) Date: Jul. 14, 2020

(87) PCT Pub. No.: WO2019/142882
PCT Pub. Date: Jul. 25, 2019

(65) Prior Publication Data
US 2020/0343832 A1     Oct. 29, 2020

(30) Foreign Application Priority Data
Jan. 17, 2018   (JP) .................... 2018-005403

(51) Int. Cl.
*H02N 3/00*       (2006.01)
(52) U.S. Cl.
CPC .................... *H02N 3/00* (2013.01)
(58) Field of Classification Search
CPC ....................................................... H02N 3/00
See application file for complete search history.

(56) References Cited

U.S. PATENT DOCUMENTS 7,674,545 B2 *   3/2010   Chun ............... H02N 3/00
                                                 429/448
7,709,126 B2 *   5/2010   Chun ............... H01M 14/00
                                                 204/600
(Continued)

FOREIGN PATENT DOCUMENTS

KR    101248271 B1 *   3/2013   ............ H02N 3/00
KR       10141942      7/2014
(Continued)

OTHER PUBLICATIONS

W. Olthuis, et al., Sensors and Actuators B: Chemical, vols. 111-112, 2005, pp. 385-389. https://doi.org/10.1016/j.snb.2005.03.039. (Year: 2005).*
(Continued)

*Primary Examiner* — Burton S Mullins
(74) *Attorney, Agent, or Firm* — BARNES & THORNBURG LLP; Jeffrey R. Stone

(57) ABSTRACT

A power generation device includes a filter holder that is a container filled with water and a filter member. The filter member is composed of porous glass in a form of a plate and arranged in the filter holder between a first space upstream from the filter member and a second space downstream from the filter member. The filter member allows hydrogen ions to pass therethrough more easily than hydroxide ions. The power generation device generates electric power based on a potential difference between the first space and the second space when a water flow from the first space toward the second space is produced in the filter member. The water flow flows along a direction of thickness of the filter member.

5 Claims, 13 Drawing Sheets

(56) References Cited

U.S. PATENT DOCUMENTS

| | | | |
|---|---|---|---|
| 10,305,396 B1* | 5/2019 | Saraf | H01M 14/00 |
| 10,944,123 B2* | 3/2021 | Dutta | H01M 4/602 |
| 2004/0241004 A1 | 12/2004 | Goodson et al. | |
| 2006/0083661 A1 | 4/2006 | Chun et al. | |
| 2009/0243428 A1* | 10/2009 | Qiao | H02N 11/002 977/832 |
| 2010/0101934 A1 | 4/2010 | Saykally et al. | |

FOREIGN PATENT DOCUMENTS

| | | | | |
|---|---|---|---|---|
| KR | 20160067452 A | * | 6/2016 | H02N 3/00 |
| KR | 20180085572 A | * | 7/2018 | F01B 23/10 |

OTHER PUBLICATIONS

H. Xu, "Energy converting devices based coupled fluidics and ion transport in nanopore systems," 2014 International Conference on Power System Technology, Chengdu, China, 2014, pp. 1730-1734, doi: 10.1109/POWERCON.2014.6993548. (Year: 2014).*

S. Wall, "The history of electrokinetic phenomena" Current Opinion in Colloid & Interface Science, vol. 15, Issue 3, 2010, pp. 119-124, ISSN 1359-0294, https://doi.org/10.1016/j.cocis.2009.12.005. (Year: 2010).*

F.A.Morrison et al. "Electrokinetic Energy Conversion in Ultrafine Capillaries", Journal of Chemical Physics, vol. 43, No. 6, Sep. 15, 1965, pp. 2111-2115. (Year: 1965).*

Frank H. J. van der Heyden et al., "Power Generation by Pressure-Driven Transport of Ions in Nanofluidic Cannels", Nano Letters, 2007, vol. 7, No. 4, pp. 1022-1025.

Jun Yang et al., "Electrokinetic microchannel battery by means of electrokinetic and microfluidic phenomena", Journal of Micromechanics and Microengineering, 13 (2003) pp. 963-970.

Myung-Suk Chun et al., "Microfluidic analysis of electrokinetic streaming potential induced by microflows of monovalent electrolyte solution", Journal of Micromechanics and Microengineering, 15 (2005) pp. 710-719.

Yo Tanaka et al., "A foot-treding type electric power generator using micro/nano channels in a porous glass filter", Proceeding of IEEE International Conference on Micro Electro Mechanical Systems (MEMS 2018), session: Jan. 21 to 25, 2018, (eds. Jens Ducree, IEEE robotics & automation society) 2018, pp. 677-680.

* cited by examiner

POWER GENERATION DEVICE AND POWER GENERATION METHOD

TECHNICAL FIELD

The present invention relates to a power generation device that generates electric power with a water flow and a power generation method.

BACKGROUND ART

Frank H. J. van der Heyden, Douwe Jan Bonthuis, Derek Stein, Christine Meyer, and Cees Dekker, "Power Generation by Pressure-Driven Transport of Ions in Nanofluidic Cannels," NANO LETTERS, 2007, vol. 7, No. 4, p 1022-p 1025 (NPL 1) discloses a technology of generation of electric power by producing a flow of a larger amount of one kind of ions ionized in water by applying a pressure to a small-diameter flow path.

CITATION LIST

Non Patent Literature

NPL 1: Frank H. J. van der Heyden, Douwe Jan Bonthuis, Derek Stein, Christine Meyer, and Cees Dekker, "Power Generation by Pressure-Driven Transport of Ions in Nanofluidic Cannels," NANO LETTERS, 2007, vol. 7, No. 4, p 1022-p 1025

SUMMARY OF INVENTION

Technical Problem

According to the technology disclosed in NPL 1, however, an amount of generated power is small. For practical use, improvement in amount of generated power is desired.

The present disclosure was made to solve the problem above, and an object thereof is to provide a power generation device capable of achieving an improved amount of generated power while using a water flow into a small-diameter flow path and a power generation method.

Solution to Problem

A power generation device according to one aspect of the present disclosure includes a container filled with water and a filter member arranged between a first space and a second space in the container, the filter member being composed of porous glass in a form of a plate. A water flow flows along a direction of thickness of the filter member. The filter member allows hydrogen ions to pass therethrough more easily than hydroxide ions. The power generation device generates electric power based on a potential difference between the first space and the second space when a water flow from the first space toward the second space is produced in the filter member.

Preferably, the power generation device further includes another filter member arranged in a flow path on a side of the first space relative to the filter member, another filter member removing an impurity in water.

A power generation device according to another aspect of the present disclosure includes a container filled with water, a filter member arranged between a first space and a second space in the container, a moving member that is moved upon receiving external pressing force to apply a pressure to the first space and to produce a first water flow from the first space toward the second space in the filter member, and a biasing member that produces a second water flow from the second space toward the first space in the filter member when the pressing force is removed from the moving member. The filter member allows hydrogen ions to pass therethrough more easily than hydroxide ions. The power generation device generates electric power based on a potential difference between the first space and the second space when a water flow is produced in the filter member.

Preferably, the power generation device further includes a catalyst provided in each of the first space and the second space, the catalyst accelerating reaction to generate water from hydrogen molecules and oxygen molecules.

Preferably, the power generation device further includes a first power storage that stores electric power in accordance with the potential difference between the first space and the second space when the first water flow is produced in the filter member and a second power storage that stores electric power in accordance with the potential difference between the first space and the second space when the second water flow is produced in the filter member.

The filter member may be composed of porous glass. The porous glass may have a pore diameter not smaller than 100 nm and not larger than 500 μm. The porous glass may have a pore diameter not smaller than 100 nm and not larger than 200 μm. The porous glass may have a pore diameter not smaller than 100 nm and not larger than 100 μm. The porous glass may have a pore diameter not smaller than 100 nm and not larger than 50 μm. The porous glass may have a pore diameter not smaller than 100 nm and not larger than 40 μm. The porous glass may have a pore diameter not smaller than 100 nm and not larger than 30 μm. The porous glass may have a pore diameter not smaller than 100 nm and not larger than 20 μm. The porous glass may have a pore diameter not smaller than 100 nm and not larger than 10 μm. The porous glass may have a pore diameter not smaller than 100 nm and not larger than 5 μm. The porous glass may have a pore diameter not smaller than 100 nm and not larger than 1 μm.

Preferably, the power generation device further includes a first support arranged on a side of the first space in the filter member and a second support arranged on a side of the second space in the filter member. The filter member is sandwiched between the first support and the second support.

A power generation method according to another aspect of the present disclosure is a power generation method by using a container filled with water and a filter member arranged between a first space and a second space in the container, the filter member being composed of porous glass in a form of a plate The filter member allows hydrogen ions to pass therethrough more easily than hydroxide ions. The power generation method includes producing a water flow from the first space toward the second space in the filter member along a direction of thickness of the filter member by applying a pressure to the first space and generating with the water flow, electric power based on a potential difference between the first space and the second space.

A power generation method according to another aspect of the present disclosure is a power generation method by using a container filled with water, a filter member arranged between a first space and a second space in the container, and a moving member. The filter member allows hydrogen ions to pass therethrough more easily than hydroxide ions. The power generation method includes producing a first water flow from the first space toward the second space in the filter member by moving the moving member upon receiving external pressing force to apply a pressure to the first space, producing a second water flow from the second space toward the first space in the filter member by removing the pressing force from the moving member, and generating electric power based on a potential difference between the first space and the second space when the first water flow or the second water flow is produced in the filter member.

Advantageous Effects of Invention

According to the present disclosure, an amount of generated power can be improved while using a water flow into a small-diameter flow path.

DESCRIPTION OF EMBODIMENTS

Figure 1:
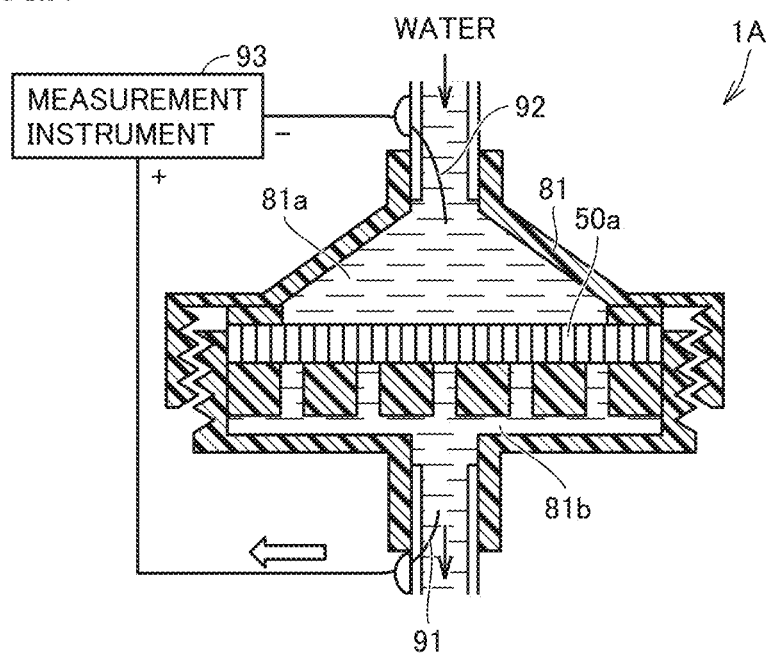
FIG. 1 is a schematic diagram showing a configuration of a power generation device according to the present embodiment.

An embodiment of the present invention will be described in detail with reference to the drawings. The same or corresponding elements in the drawings have the same reference characters allotted and description thereof will not be repeated. An embodiment or a modification described below may be combined as appropriate.

(Configuration of Power Generation Device)

FIG. 1 is a diagram showing a configuration of a power generation device according to the present embodiment. A power generation device 1A shown in FIG. 1 includes a filter holder 81 which is a container filled with water and a filter member 50a. Filter member 50a is composed of porous glass in a form of a plate arranged between a first space 81a upstream from filter member 50a and a second space 81b downstream from filter member 50a in filter holder 81. Filter member 50a allows hydrogen ions to pass therethrough more easily than hydroxide ions. Power generation device 1A generates electric power based on a potential difference between first space 81a and second space 81b when a water flow from first space 81a toward the second space (81b) is produced in filter member 50a. A water flow flows along a direction of thickness of filter member 50a. With power generation device 1A shown in FIG. 1, an amount of generated power can be improved while using a water flow into a small-diameter flow path. One application of the power generation device according to the present embodiment will be described below.

Figure 2:
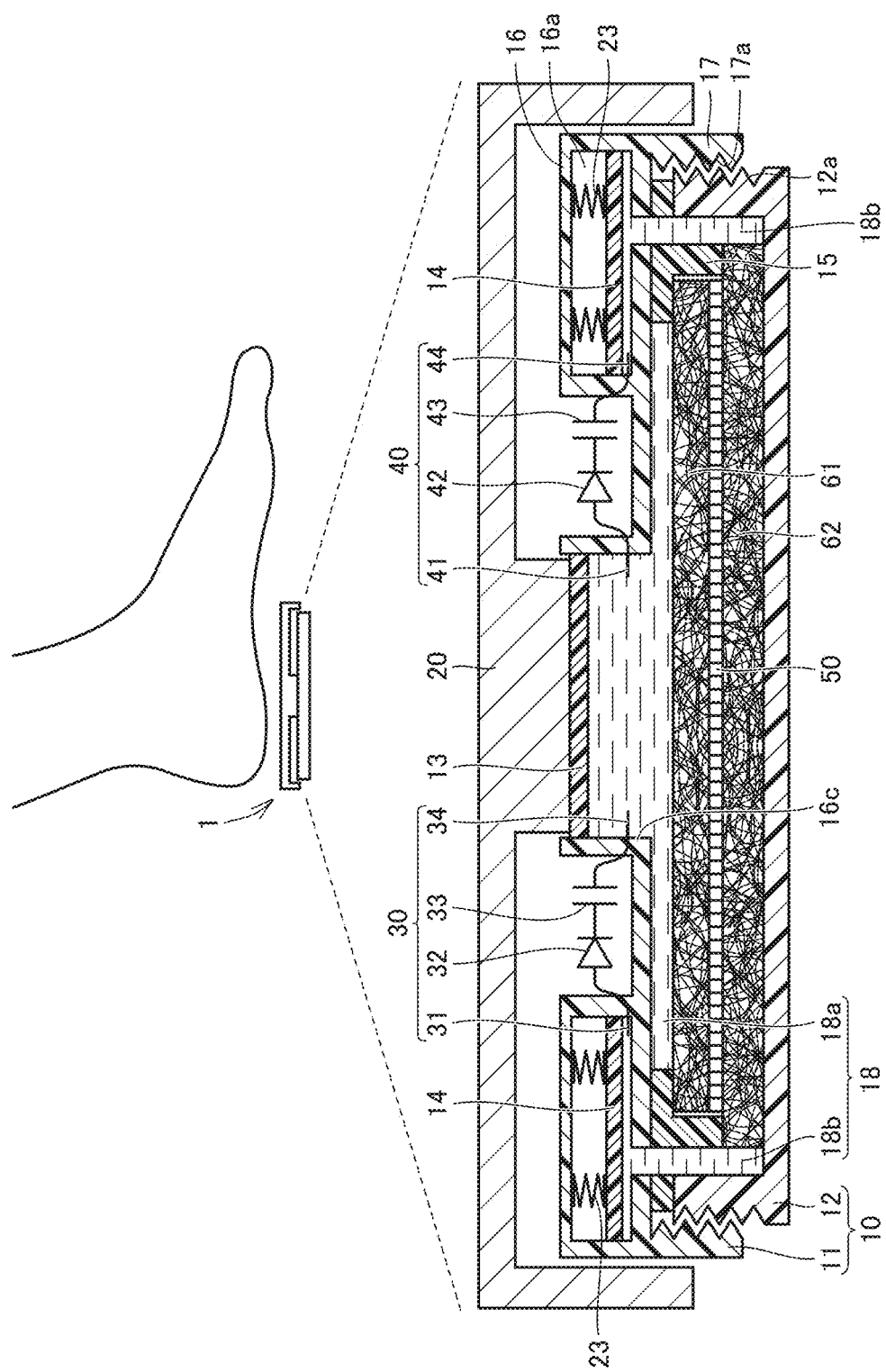
FIG. 2 is a diagram showing one application of the configuration of the power generation device according to the present embodiment.

FIG. 2 is a diagram showing one application of the power generation device according to the present embodiment. A power generation device 1 shown in FIG. 2 converts kinetic energy of a foot in a walking operation by a human body into electric power. Without being limited to the walking operation, the power generation device may convert kinetic energy resulting from another operation of a human body (for example, a sitting operation) into electric power. Furthermore, the power generation device may convert kinetic energy of an animal other than a human and kinetic energy of a machine into electric power.

Power generation device 1 includes a container 10, a filter member 50, supports 61 and 62, a moving member 20, a first circuit 30, and a second circuit 40.

Container 10 includes an upper container 11, a lower container 12, movable plates 13 and 14, and a sealing member 15. Lower container 12 is a cylindrical member with bottom. Upper container 11 is constituted of a ring portion 16 in a form of a plain washer provided with a hollow space 16a and a hanging-down portion 17 extending downward from an outer circumferential end of ling portion 16. In a lower surface of ring portion 16, an annular slit 16b connected to hollow space 16a is provided.

A male thread 12a is cut in an outer circumferential surface of lower container 12. A female thread 17a to which male thread 12a can be screwed is cut in an inner circumferential surface of hanging-down portion 17. By mating male thread 12a of lower container 12 and female thread 17a of the upper container with each other with sealing member 15 being arranged between upper container 11 and lower container 12, upper container 11 and lower container 12 are integrated with each other. When upper container 11 and lower container 12 are integrated with each other, hollow space 16a provided in ring portion 16 communicates with an internal space in lower container 12 through slit 16b. A space surrounded by an inner circumferential wall 16c of ring portion 16 also communicates with the internal space in lower container 12.

Movable plate 13 is in a form of a disc and closes a space surrounded by inner circumferential wall 16c of ring portion 16. Movable plate 13 is vertically slidable over inner circumferential wall 16c of ring portion 16.

Movable plate 14 is in a form of a plain washer and arranged in hollow space 16a in ring portion 16. Movable plate 14 is vertically slidable over a sidewall surface of hollow space 16a.

Upper container 11, lower container 12, movable plates 13 and 14, and sealing member 15 define a hermetically sealed space 18 and hermetically sealed space 18 is filled with water.

Filter member 50 is a member in a form of a plate that allows hydrogen ions to pass therethrough more easily than hydroxide ions. Filter member 50 is composed, for example, of porous glass in a form of a plate, a glass plate in which capillaries formed of glass are two-dimensionally disposed, or a glass plate in which a plurality of pores are provided.

Supports 61 and 62 support filter member 50 by sandwiching filter member 50 in the form of the plate therebetween. Break of filter member 50 can thus be suppressed. Supports 61 and 62 should only be made from a member that allows passage of water therethrough more easily than filter member 50, and they are composed, for example, of porous glass larger in pore diameter than filter member 50.

Filter member 50 and supports 61 and 62 are accommodated in lower container 12 to serve as a partition between a first space 18a and a second space 18b in hermetically sealed space 18. First space 18a is surrounded by upper container 11, movable plate 13, sealing member 15, and support 61. Second space 18b is surrounded by upper container 11, movable plate 14, sealing member 15, lower container 12, and support 62. Second space 18b includes a part of hollow space 16a. In other words, filter member 50 is arranged between first space 18a and second space 18b. Support 61 is arranged on a side of first space 18a in filter member 50 and support 62 is arranged on a side of second space 18b in filter member 50.

Moving member 20 is moved downward upon receiving pressing force from a foot of a human body (that is, gravity from the human body). Moving member 20 is connected to movable plate 13. Therefore, as moving member 20 is moved downward, movable plate 13 is also moved downward. When movable plate 13 is moved downward, some of water in first space 18a flows into second space 18b through support 61, filter member 50, and support 62. Movable plate 14 is thus moved upward. Moving member 20 thus serves as a water flow production member that produces a water flow from first space 18a toward second space 18b.

Moving member 20 and movable plate 13 may integrally be formed. Moving member 20 may close the space surrounded by inner circumferential wall 16c of ring portion 16 and slide vertically over inner circumferential wall 16c. In this case, movable plate 13 does not have to be provided.

A plurality of coil springs 23 are arranged between a ceiling over hollow space 16a and movable plate 14. As movable plate 14 is moved upward as a result of application of pressing force from a foot to moving member 20, coil spring 23 is compressed and elastic energy is stored in coil spring 23. As pressing force is removed from moving member 20, coil spring 23 applies downward biasing force to movable plate 14 with stored elastic energy. Some of water in second space 18b thus flows into first space 18a through support 62, filter member 50, and support 61.

First circuit 30 includes a positive electrode terminal 31, a diode 32, a capacitor 33, and a negative electrode terminal 34. Positive electrode terminal 31 is arranged in second space 18b in container 10. Diode 32 has an anode connected to positive electrode terminal 31 and a cathode connected to one end of capacitor 33. Capacitor 33 has the other end connected to negative electrode terminal 34. Negative electrode terminal 34 is arranged in first space 18a in container 10. A Pt catalyst is attached to a surface of positive electrode terminal 31 and negative electrode terminal 34.

(Principles of Power Generation by Power Generation Device)

Figure 3:
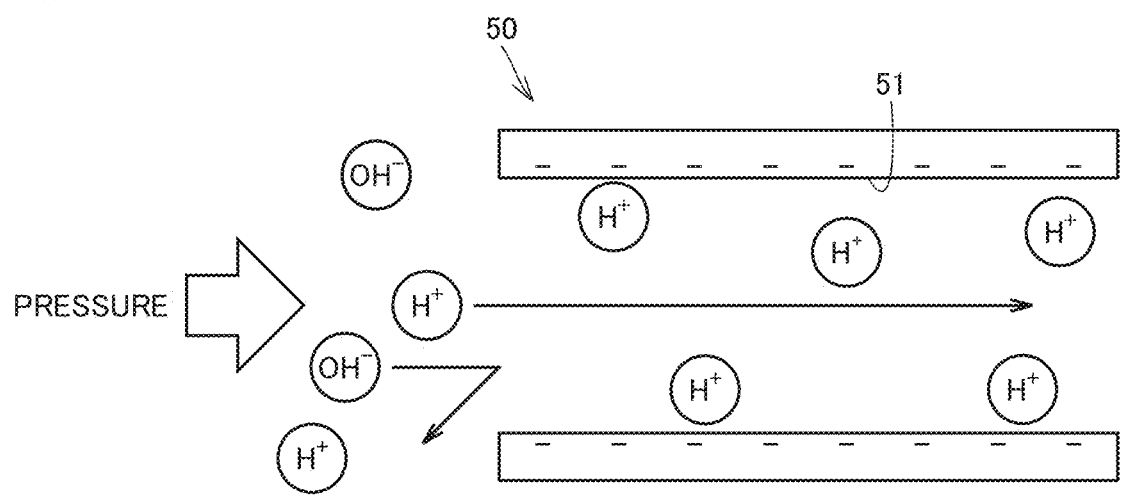
FIG. 3 is a diagram illustrating principles of power generation with a water flow.

FIG. 3 is a diagram illustrating principles of power generation with a water flow. FIG. 3 shows a flow of pure water through a small-diameter flow path 51 within filter member 50 made of glass. Some of water is ionized into hydrogen ions ($H^+$) and hydroxide ions ($OH^-$) owing to thermal balance. As a pressure is applied to water and water is guided to small-diameter flow path 51, hydrogen ions readily pass through flow path 51 whereas hydroxide ions are less likely to enter flow path 51. This is because a wall surface of flow path 51 is negatively charged due to the presence of silanol groups. In other words, filter member 50 allows hydrogen ions to pass therethrough more easily than hydroxide ions owing to surface charges thereof. Consequently, a concentration of hydrogen ions increases at an outlet of flow path 51 and a concentration of hydroxide ions increases at an inlet of flow path 51. In other words, small-diameter flow path 51 within filter member 50 made of glass functions as an ion filter.

Figure 4:
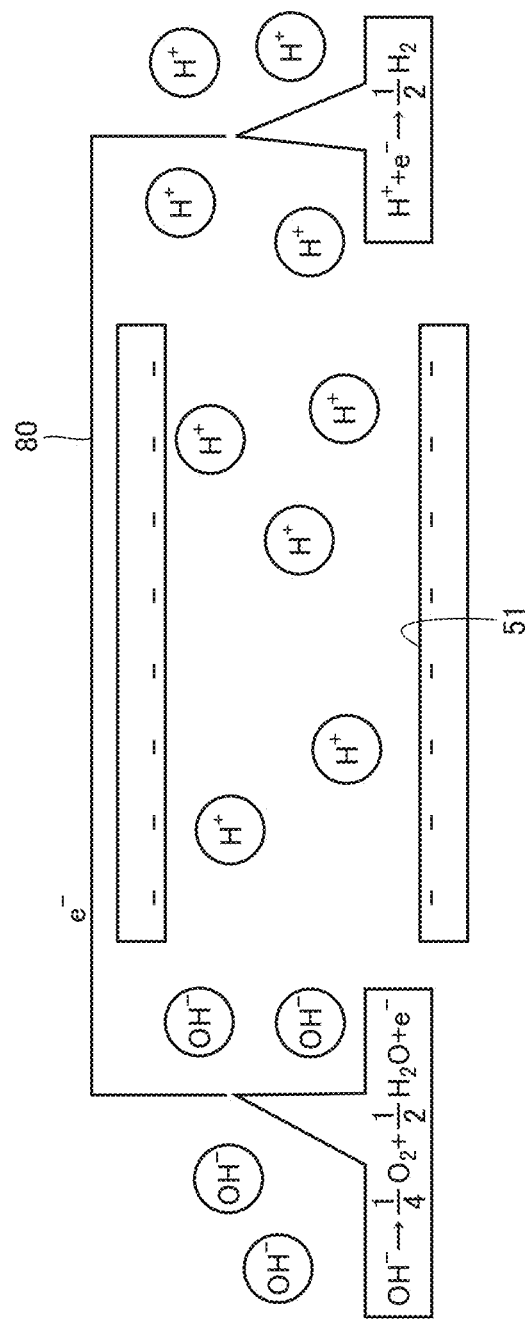
FIG. 4 is a diagram illustrating a flow of electrons when an inlet and an outlet of a flow path are connected to each other through a conductive circuit.

FIG. 4 is a diagram illustrating a flow of electrons when the inlet and the outlet of flow path 51 are connected to each other through a conductive circuit 80. As described above, since the concentration of hydroxide ions increases at the inlet of flow path 51 and the concentration of hydrogen ions increases at the outlet of flow path 51, a potential difference is produced between the inlet and the outlet of flow path 51. Therefore, a flow of electrons is produced in conductive circuit 80. At the inlet of flow path 51, hydroxide ions react in accordance with a chemical reaction formula (1) below to generate oxygen molecules ($O_2$), water ($H_2O$), and electrons ($e^-$).

$$OH^- \rightarrow 1/4 O_2 + 1/2 H_2O + e^- \qquad (1)$$

Generated electrons flow to conductive circuit 80.

At the outlet of flow path 51, hydrogen ions that have received electrons from conductive circuit 80 react in accordance with a chemical reaction formula (2) below to generate hydrogen molecules ($H_2$).

$$H + e^- \rightarrow 1/2 H_2 \qquad (2)$$

A current thus flows through conductive circuit 80 and hydrogen ions and hydroxide ions are converted to hydrogen molecules and oxygen molecules in accordance with the chemical reaction formulae (1) and (2). New hydrogen ions and hydroxide ions, however, are generated from remaining water owing to thermal balance. Furthermore, generated hydrogen molecules and oxygen molecules are converted back to water by the Pt catalyst. Therefore, so long as a water flow is produced in flow path 51, a current permanently continues to flow through conductive circuit 80.

Figure 5:
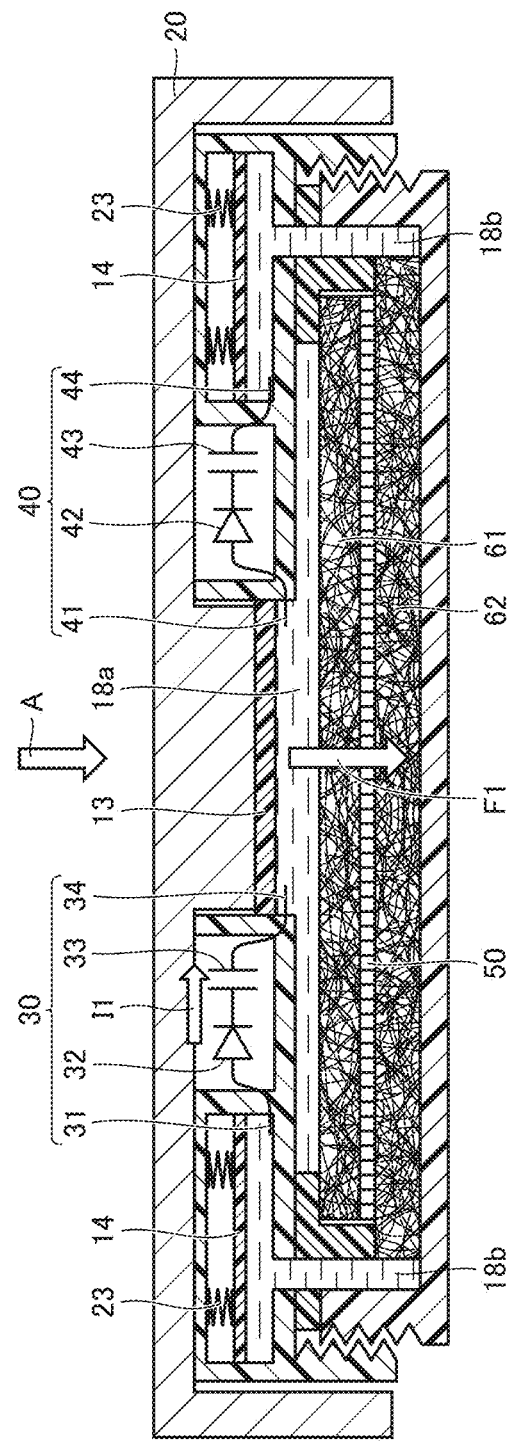
FIG. 5 is a diagram showing a water flow and a current produced at the time when a moving member receives pressing force.

FIG. 5 is a diagram showing a water flow and a current produced at the time when moving member 20 receives pressing force A. As moving member 20 is moved downward upon receiving pressing force A from a foot of a human body, movable plate 13 is also moved downward. A pressure is thus applied to first space 18a. When the pressure applied to first space 18a is higher than a pressure applied to second space 18b by coil spring 23, water in first space 18a flows to second space 18b through support 61, filter member 50, and support 62. In other words, a first water flow F1 from first space 18a toward second space 18b is produced in filter member 50. As shown in FIG. 5, first water flow F1 flows along the direction of thickness of filter member 50 in the form of the plate. Since water flows into second space 18b at this time, movable plate 14 is moved upward against biasing force applied by coil spring 23.

With first water flow F1, the concentration of hydroxide ions increases in first space 18a and the concentration of hydrogen ions increases in second space 18b. Thus, second space 18b is higher in potential than first space 18a, and in first circuit 30, a current I1 from positive electrode terminal 31 provided in second space 18b toward negative electrode terminal 34 provided in first space 18a is generated. Consequently, electric power is stored in capacitor 33. In second circuit 40, on the other hand, no current flows owing to a diode 42 having an anode connected to a positive electrode terminal 41 provided in first space 18a and a cathode connected to a negative electrode terminal 44 provided in second space 18b with a capacitor 43 being interposed.

As current I1 flows through first circuit 30, hydroxide ions are converted to oxygen molecules and water in first space 18a, and hydrogen ions are converted to hydrogen molecules in second space 18b.

Figure 6:
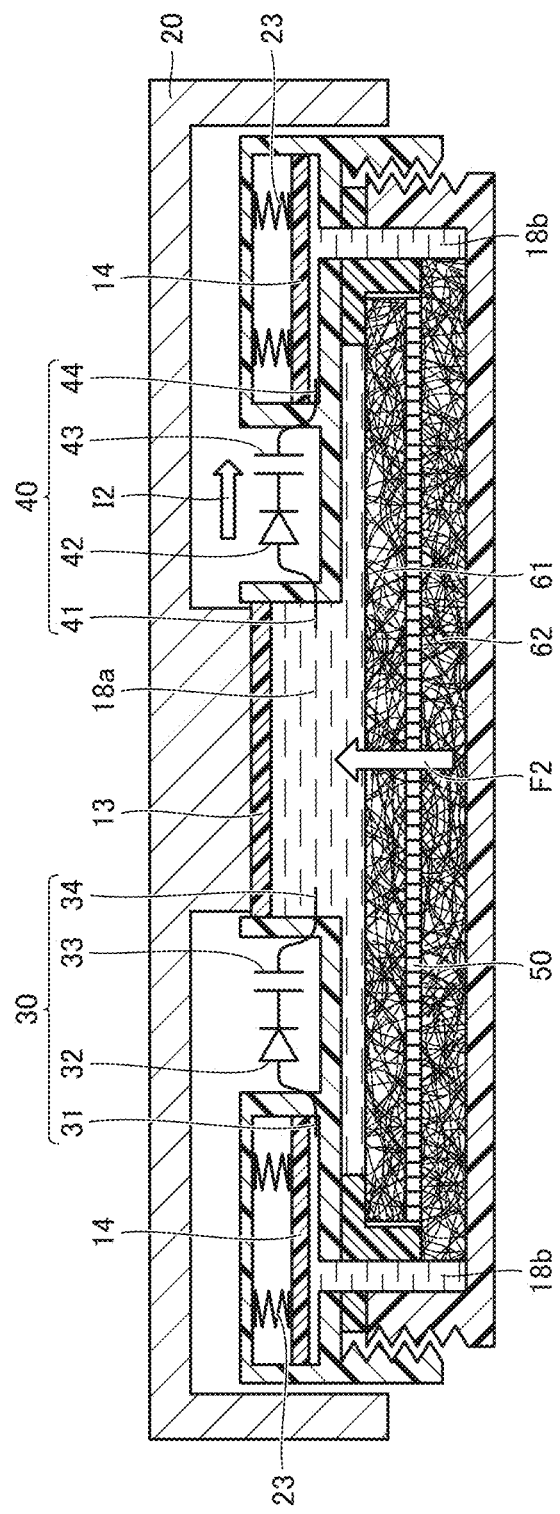
FIG. 6 is a diagram showing a water flow and a current produced at the time when pressing force is removed from the moving member.

FIG. 6 is a diagram showing a water flow and a current produced at the time when pressing force A is removed from moving member 20. As pressing force A (see FIG. 5) is removed from moving member 20, movable plate 14 is moved downward upon receiving biasing force from coil spring 23. Thus, a pressure is applied to second space 18b and water in second space 18b flows to first space 18a through support 62, filter member 50, and support 61. In other words, a second water flow F2 from second space 18b toward first space 18a is produced in filter member 50. Since water flows into first space 18a at this time, movable plate 13 and moving member 20 are moved back in an upward direction.

With second water flow F2, the concentration of hydrogen ions increases in first space 18a and the concentration of hydroxide ions increases in second space 18b. Thus, first space 18a is higher in potential than second space 18b, and a current I2 from positive electrode terminal 41 provided in first space 18a toward negative electrode terminal 44 provided in second space 18b is generated in second circuit 40. Consequently, electric power is stored in capacitor 43. In first circuit 30, on the other hand, no current flows owing to diode 32 having the anode connected to positive electrode terminal 31 provided in second space 18b and the cathode connected to negative electrode terminal 34 provided in first space 18a with capacitor 33 being interposed.

As current I2 flows through second circuit 40, hydrogen ions are converted to hydrogen molecules in first space 18a, and hydroxide ions are converted to oxygen molecules and water in second space 18b.

With the walking operation of the human body, a state that moving member 20 receives pressing force A and a state that pressing force A is removed from moving member 20 are repeated. Electric power is thus kept stored alternately in capacitors 33 and 43.

In first space 18a, as described above, oxygen molecules are generated when current I1 flows through first circuit 30 and hydrogen molecules are generated when current I2 flows through second circuit 40. Generated hydrogen molecules and oxygen molecules react with each other in accordance with a chemical reaction formula (3) below to return to water.

$$H_2 + 1/2 O_2 \rightarrow H_2O \quad (3)$$

The reaction is accelerated by the Pt catalyst attached to positive electrode terminal 41 and negative electrode terminal 34.

In second space 18b, hydrogen molecules are generated when current I1 flows through first circuit 30, and oxygen molecules are generated when current I2 flows through second circuit 40. Generated hydrogen molecules and oxygen molecules react with each other in accordance with the chemical reaction formula (3) to return to water. The reaction is accelerated by the Pt catalyst attached to positive electrode terminal 31 and negative electrode terminal 44.

By modifying as appropriate ion filter characteristics of filter member 50, power generation device 1 may generate electric power based on a potential difference between first space 18a and second space 18b only when first water flow F1 is produced in filter member 50. Alternatively, power generation device 1 may generate electric power based on a potential difference between first space 18a and second space 18b only when second water flow F2 is produced in filter member 50.

In consideration of power generation efficiency, however, electric power is naturally most preferably generated in each case of production of first water flow F1 and production of second water flow F2 in filter member 50.

Any electrolyte solution containing salt of another electrolyte may be adopted as a liquid with which container 10 is filled. When an electrolyte solution other than water is adopted, generally, a debye length of filter member 50 tends to be shorter and power generation efficiency tends to be lower owing to attachment of electrolyte ions other than hydrogen ions and hydroxide ions to a surface of glass. Therefore, water is most suitable.

(Power Generation Performance)

Figure 7:
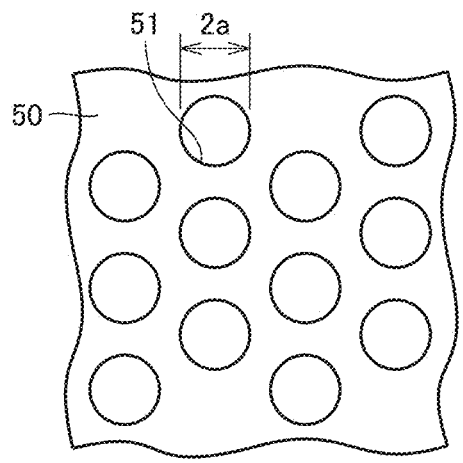
FIG. 7 is an enlarged plan view showing a filter member.
Figure 8:
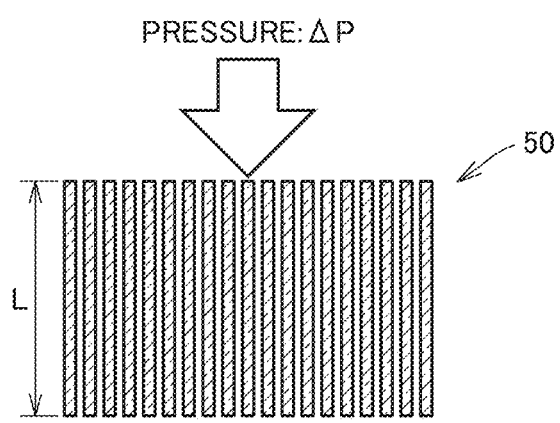
FIG. 8 is an enlarged cross-sectional view showing the filter member.

FIG. 7 is an enlarged plan view showing filter member 50. FIG. 8 is an enlarged cross-sectional view showing filter member 50. As shown in FIGS. 7 and 8, flow path 51 in filter member 50 has a diameter of $2a$ and a length of L. An amount Q of water that flows through a pipe having a radius of $a$ and a length of L per unit time is expressed in an expression (4) below, in accordance with the Hagen-Poiseuille Law:

$$Q = \pi a^4 \Delta P / 8 \mu L \quad (4)$$

where $\Delta P$ represents a pressure difference between the inlet and the outlet of the pipe and $\mu$ represents viscosity of water.

Therefore, when filter member 50 has an area of S and filter member 50 includes p flow paths per unit area, time t required for water in a volume of $\Delta V$ to pass through filter member 50 is expressed in an expression (5) below.

$$t = 8 \mu L \Delta V / p S \pi a^4 \Delta P \quad (5)$$

In power generation device 1 shown in FIG. 2, a time period for which pressing force is applied from a foot to moving member 20 corresponds to a time period for which the foot is landing in the walking operation of the human body. A volume of water to be accommodated in container 10 and a diameter and a length of flow path 51 should be designed as appropriate based on a time period for which the foot is landing.

A voltage U and a current I across the inlet and the outlet of filter member 50 are expressed in expressions (6) and (7) below, where $\zeta$ represents a zeta potential at an interface between a sidewall of flow path 51 and water, e represents a dielectric constant of water, and K represents a conductivity of water.

$$U = \varepsilon \zeta \Delta P / \mu K \quad (6)$$

$$I = p S \pi a^2 \varepsilon \zeta \Delta P / \mu L \quad (7)$$

An amount of generated power (=U·I) of power generation device 1 can be estimated based on the expressions (6) and (7).

(Experiment for Verifying Amount of Generated Power)

An experiment for verifying an amount of power generated by power generation device 1 shown in FIG. 2 was conducted. FIG. 1 shows power generation device 1A used for the verification experiment. In power generation device 1A shown in FIG. 1, filter member 50a was arranged in filter holder 81 which was a container filled with water and water was passed through filter member 50a by applying a pressure to water. In other words, filter member 50a was arranged between first space 81a upstream from filter member 50a and second space 81b downstream from filter member 50a in filter holder 81. Then, a water flow from first space 81a toward second space 81b was produced in filter member 50a. The water flow flowed along the direction of thickness of filter member 50a. A voltage and a current across a positive electrode terminal 91 provided downstream from filter member 50a and a negative electrode terminal 92 provided upstream from filter member 50a were measured with a measurement instrument 93. Swinnex filter holder, 25 mm (manufactured by Millipore Japan) was employed as filter holder 81.

(Experiment 1)

Variation in amount of generated power depending on a diameter of a flow path in filter member 50a was checked. Specifically, glass filter plates (manufactured by Fujirika) composed of four types of porous glass different from one another in pore diameter and manufactured by sintering pulverized glass were employed as filter member 50a. A water pressure of 0.1 MPa generated by a pressure compressor was applied to the glass filter plates. Pure water (milli-Q water) made by an ultrapure water purification apparatus manufactured by Merck Millipore was employed as water. The four types of glass filter plates included a glass filter plate of sample No. 1 having a pore diameter from 40 to 50 µm, a glass filter plate of sample No. 2 having a pore diameter from 20 to 30 µm, a glass filter plate of sample No. 3 having a pore diameter from 5 to 10 µm, and a glass filter plate of sample No. 4 having a pore diameter not larger than 1 µm. The glass filter plates of samples Nos. 1 to 4 were in a form of a disc having a diameter of 20 mm and a thickness of 3 mm. The pore diameter (hole diameter) is an average pore diameter measured with a mercury porosimeter (a mercury intrusion method).

Figure 9:
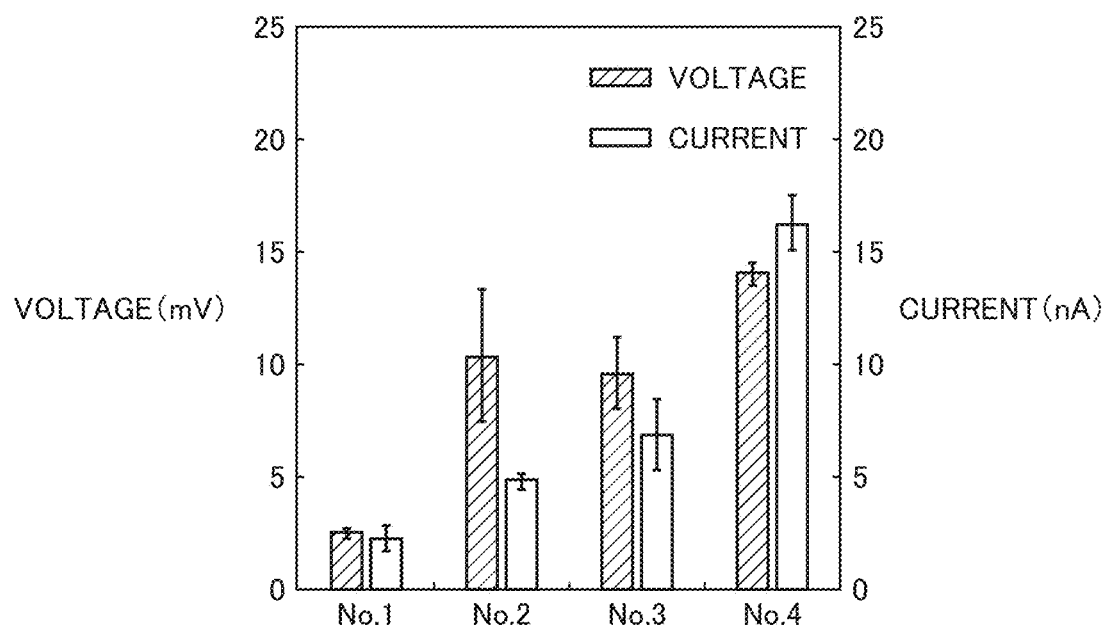
FIG. 9 shows a graph of a result of measurement of a voltage value and a current value when glass filter plates of samples Nos. 1 to 4 are used.

FIG. 9 shows a graph of a result of measurement of a voltage value and a current value when the glass filter plates of samples Nos. 1 to 4 were used. As shown in FIG. 9, it was confirmed that a current value and a voltage value increased with decrease in pore diameter regardless of a constant water pressure.

As shown in the expression (6), the voltage value is theoretically not dependent on the pore diameter. It was estimated, however, that, in the glass titter plate large in pore diameter, the water pressure applied by the pressure compressor did not concentrate in the glass filter plate and loss was produced in another part (for example, a pipe). It was consequently estimated that the actual water pressure applied to the glass filter plate was lower than 0.1 MPa and the voltage value lowered in the glass filter plate large in pore diameter. As derived from the expressions (4) and (7), on the other hand, it can be seen that the current value per flow rate was in inverse proportion to a square of radius a of the pore and hence the current generated per flow rate was higher as the pore diameter was smaller. It was estimated that, when the pore diameter was extremely large, the wall effect by the silanol groups was lowered and the function of flow path 51 as the ion filter was lowered, which hence resulted in lower power generation efficiency.

Based on the results shown in FIG. 9, by employing the glass filter plates of samples Nos. 1 to 4 having a pore diameter not larger than 50 µm, electric power based on a potential difference between first space 81a and second space 81b could be generated when the water flow from first space 81a (see FIG. 1) toward second space 81b (see FIG. 1) was produced in the glass filter plate. Thus, in adopting porous glass, by way of example, porous glass having a pore diameter not larger than 50 µm that exhibited the power generation effect in the present experiment can be adopted. Since a generated current is theoretically higher as the pore diameter is smaller as derived from the expressions (4) and (7), the lower limit of the pore diameter is not particularly limited. When the pore diameter is excessively small, however, break caused by a water pressure is more likely. Therefore, the lower limit of the pore diameter (for example, 100 nm) is set as appropriate in consideration of resistance of the glass filter plate against a water pressure.

(Experiment 2)

Figure 10:
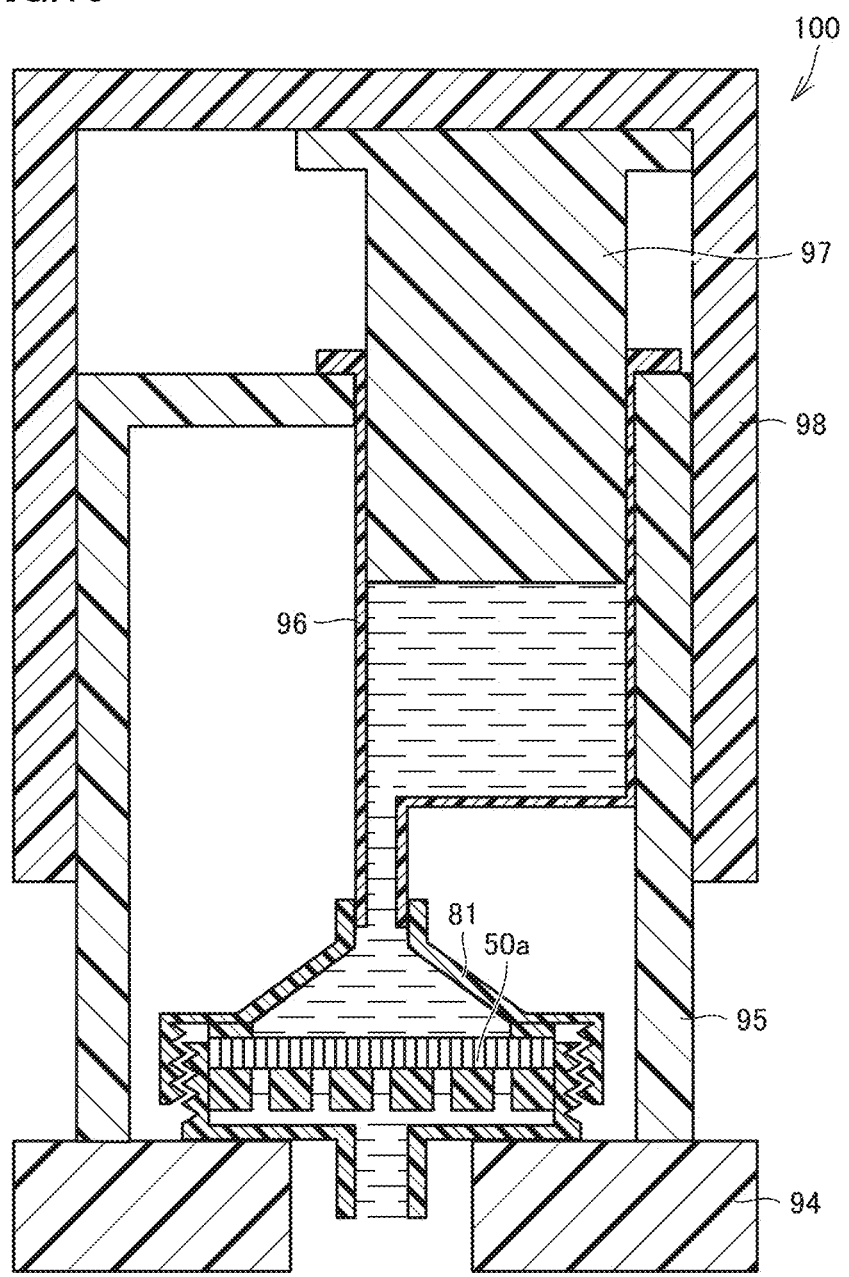
FIG. 10 is a schematic diagram showing a cross-section of a jig for applying pressing force from a foot to water in a filter holder shown in FIG. 1.

FIG. 10 is a schematic diagram showing a cross-section of a jig for applying pressing force from a foot to water in filter holder 81 shown in FIG. 1. FIG. 10 does not show measurement instrument 93. The glass filter plate of sample No. 4 was employed as filter member 50a in filter holder 81. As shown in FIG. 10, a jig 100 includes a base 94 that supports filter holder 81, a syringe holder 95 provided on base 94, a syringe 96 held by syringe holder 95, a piston 97 movable in syringe 96, and a lid 98 in contact with an upper surface of piston 97. Syringe 96 has an outlet connected to an inlet of filter holder 81. By stepping on lid 98 and applying the weight (approximately 60 kg) to piston 97, a pressure of 0.7 MPa was applied to 50 mL of pure water (milli-Q water) with which syringe 96 was filled, to pass water through the glass filter plate of sample No. 4.

Figure 11:
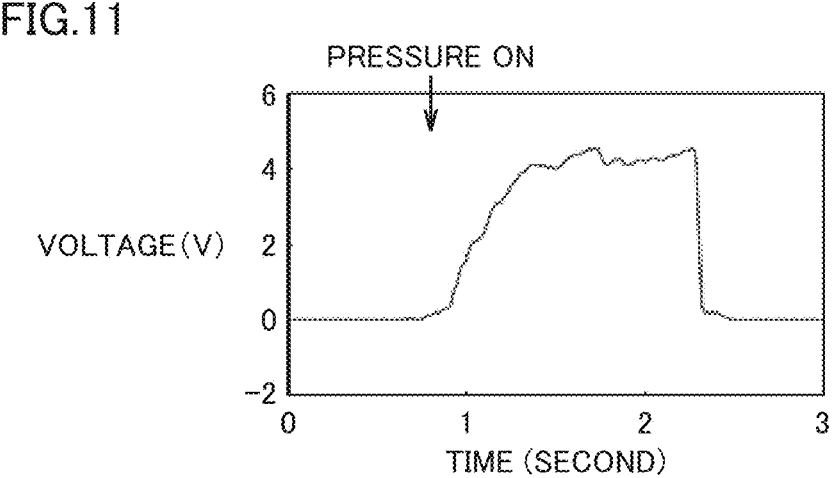
FIG. 11 shows a graph of a result of measurement of a voltage generated while 50 mL of pure water passes through the glass filter plate of sample No. 4.
Figure 12:
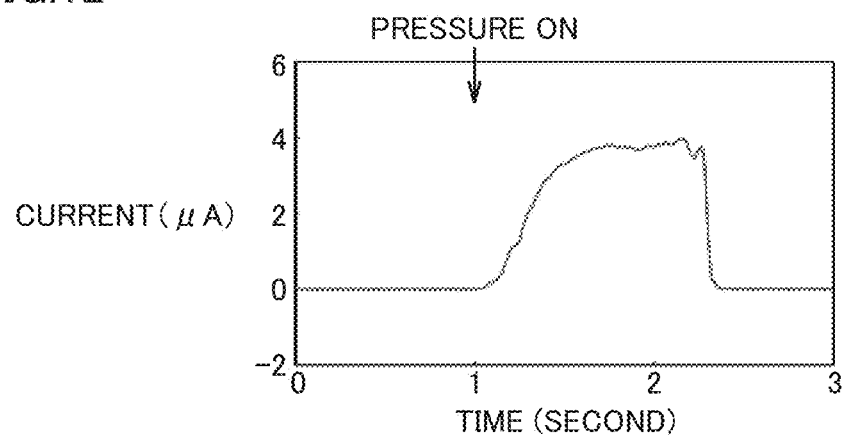
FIG. 12 shows a graph of a result of measurement of a current that flows while 50 mL of pure water passes through the glass filter plate of sample No. 4.

FIG. 11 shows a graph of a result of measurement of a voltage generated while 50 mL of pure water passed through the glass filter plate of sample No. 4. FIG. 12 shows a graph of a result of measurement of a current that flowed while 50 mL of pure water passed through the glass filter plate of sample No. 4. A time period required for 50 mL of pure water to pass through the glass filter plate under a pressure of 0.7 MPa was approximately one second. Therefore, as shown in FIGS. 11 and 12, 20 µW of electric power at a voltage of 5 V and a current of 4 µA could be generated for approximately one second. Twenty microwatts (µW) of electric power were significantly higher than electric power disclosed in NPL 1. Since power can be kept generated for approximately one second, motions of the human body low in vibration frequency can also sufficiently be applicable.

(Experiment 3)

Jig 100 shown in FIG. 10 was used and a capacitor having a capacitance of 1 µF was connected instead of measurement instrument 93 (FIG. 1). Fifty milliliters of pure water were supplied into syringe 96 and electric power was stored in the capacitor by an operation to step on lid 98. Thereafter, electric power stored in the capacitor was supplied to an LED. The LED brightly illuminated for approximately 0.1 second.

(Experiment 4)

Jig 100 shown in FIG. 10 was used and an LED was directly connected instead of measurement instrument 93 (FIG. 1). Fifty milliliters of pure water were supplied into syringe 96 and an operation to step on lid 98 was performed.

Then, the LED illuminated for approximately one second during the operation, although emitted light was weak.

(Experiment 5)

Instead of the commercially available glass filter plates (manufactured by Fujirika) employed in Experiments 1 to 4, a glass filter plate (a porous glass plate) obtained by sintering glass powders was employed and measurement with a method the same as in Experiment 2 was conducted.

Borosilicate glass powders (having a particle size from 16 to 40 μm) obtained by pulverizing "IWAKI CTE 33 glass tube" (manufactured by AGC Techno Glass Co., Ltd.) were employed as glass powders. A glass filter plate of sample No. 5 in a shape of a disc having a diameter of 20 mm and a thickness from 2 to 3 mm was manufactured by forming borosilicate glass powders in a jig made of carbon and sintering the borosilicate glass powders in a vacuum furnace at a sintering temperature of 800° C. for a time period of 0.5 hour with an alumina weight being carried thereon. A glass filter plate of sample No. 6 was manufactured with a method the same as that for sample No. 5 except for setting a time period for sintering to 1.0 hour. A glass filter plate of sample No. 7 was manufactured with a method the same as that for sample No. 5 except for setting a time period for sintering to 1.5 hour.

Figure 13A:
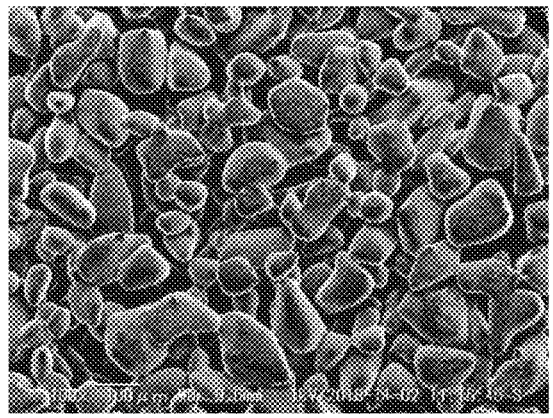
FIG. 13A is a diagram showing a scanning electron microscope (SEM) image of a cutaway plane of a glass filter plate of sample No. 5.
Figure 13B:
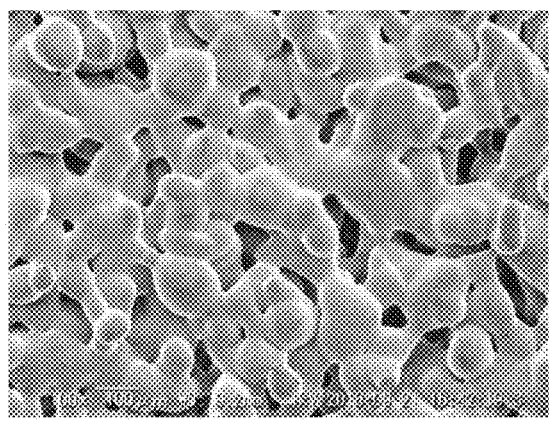
FIG. 13B is a diagram showing an SEM image of a cutaway plane of a glass filter plate of sample No. 6.
Figure 13C:
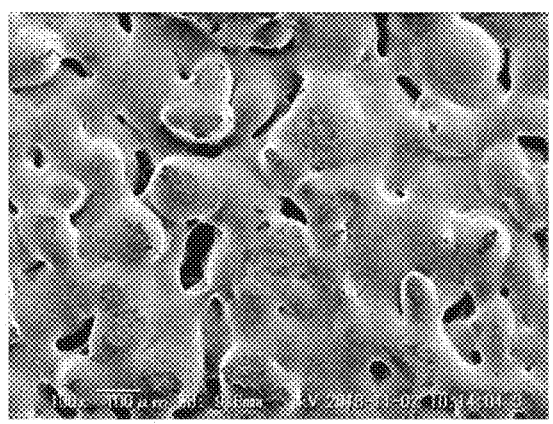
FIG. 13C is a diagram showing an SEM image of a cutaway plane of a glass filter plate of sample No. 7.

FIG. 13A is a diagram showing a scanning electron microscope (SEM) image of a cutaway plane of the glass filter plate of sample No. 5. FIG. 13B is a diagram showing an SEM image of a cutaway plane of the glass filter plate of sample No. 6. FIG. 13C is a diagram showing an SEM image of a cutaway plane of the glass filter plate of sample No. 7. As shown in FIGS. 13A to 13C, the glass filter plates of samples Nos. 5 to 7 were porous.

Figure 14:
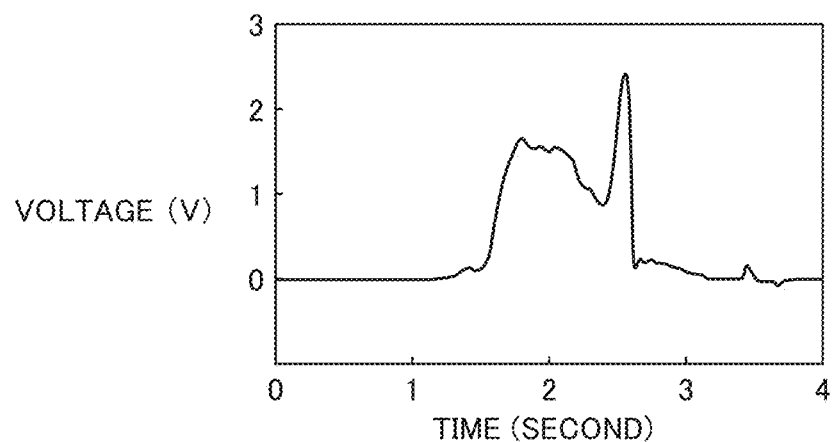
FIG. 14 shows a graph of a result of measurement of a voltage generated while 50 mL of pure water passes through the glass filter plate of sample No. 6.
Figure 15:
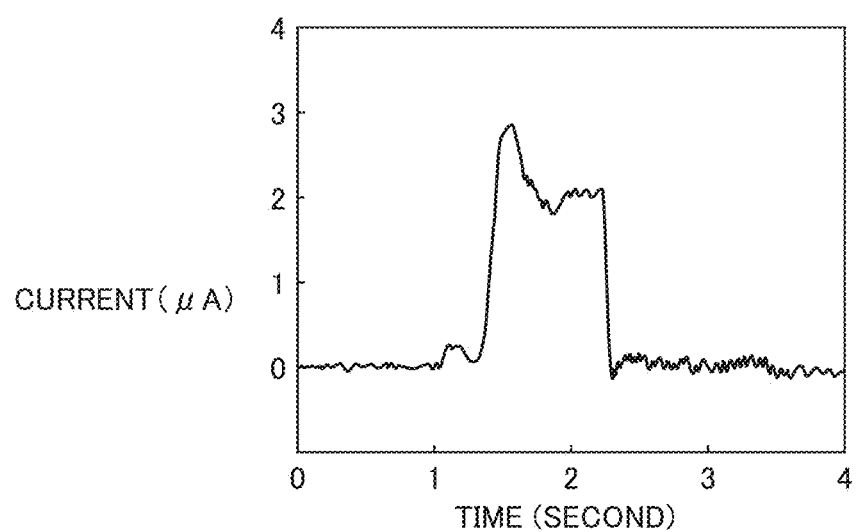
FIG. 15 shows a graph of a result of measurement of a current that flows while 50 mL of pure water passes through the glass filter plate of sample No. 6.

FIG. 14 shows a graph of a result of measurement of a voltage generated while 50 mL of pure water passed through the glass filter plate of sample No. 6. FIG. 15 shows a graph of a result of measurement of a current that flowed while 50 mL of pure water passed through the glass filter plate of sample No. 6. As shown in FIGS. 14 and 15, it was confirmed that relatively high electric power having a maximum voltage value of 2.5 V and a maximum current value of 2.8 μA was generated by employing the glass filter plate of sample No. 6. Table 1 shows results of measurement of the maximum voltage value and the maximum current value of samples Nos. 5 to 7.

TABLE 1

| | Time Period for Sintering (h) | Maximum Voltage Value (V) | Maximum Current Value (μA) |
|---|---|---|---|
| Sample No. 5 | 0.5 | 0.6 | 1.2 |
| Sample No. 6 | 1.0 | 2.5 | 2.8 |
| Sample No. 7 | 1.5 | 0.3 | Not Measured Because of Break |

(Experiment 6)

Measurement with a method the same as in Experiment 2 was conducted by using tap water instead of pure water (milli-Q water). Then, it was confirmed that a voltage from 100 to 200 mV was generated and power at a practically usable level was generated.

A power generation device making use of a streaming current has conventionally been provided with a single small-diameter and long flow path as described in NPL 1. It was high in electrical resistance and an amount of a current was very small.

In order to increase an amount of generated power, a current value should be increased by integrating a large number of small-diameter and long flow paths in parallel. To this end, for example, a device like a capillary plate substrate in which a plurality of flow paths are aligned in parallel in good order without being in contact with one another may be provided as a filter member to implement a circuit in which short flow paths are integrated in parallel.

One of features of the present embodiment is that porous glass in a form of a plate may be employed for integrating such short flow paths in parallel. By employing porous glass for a filter member, a water flow is more complicated than in an example where a structure like a capillary plate substrate including a plurality of flow paths aligned in parallel in good order without being in contact with one another is employed as the filter member. Since a pattern of generated glass pores is random, water flow paths also meander or run around in a complicated manner along shapes thereof, a plurality of flow paths may come in contact with one another in some portions, or a flow path may come to a dead end in some portions.

Then, it is also apparently predicted that, when porous glass is employed as a parallel circuit of a filter member, an effect of multiplication of a current value (power value) owing to arrangement in parallel cannot be expected. In Experiments 1 to 6 in which porous glass was employed for the filter member, however, it was confirmed as shown above that relatively high electric power was generated. It was thus confirmed that a power generation device including a parallel circuit in which a large number of short flow paths are integrated can be implemented by employing porous glass for the filter member, and the power generation device including porous glass for the filter member was completed.

(Function and Effect)

As set forth above, power generation device 1 according to the present embodiment includes container 10 filled with water, filter member 50 arranged between first space 18a and second space 18b in container 10, the filter member being composed of porous glass in a form of a plate, and moving member 20 serving as a water flow production member that produces a water flow from first space 18a toward second space 18b in filter member 50 as a result of application of a pressure to first space 18a. A water flow flows along the direction of thickness of filter member 50. Fitter member 50 allows hydrogen ions to pass therethrough more easily than hydroxide ions. The power generation device generates electric power based on a potential difference between first space 18a and second space 18b when a water flow is produced in filter member 50.

Alternatively, power generation device 1 according to the present embodiment can also be expressed as below. The power generation device includes container 10 filled with water, filter member 50 arranged between first space 18a and second space 18b in container 10, moving member 20, and coil spring 23 serving as the biasing member. Moving member 20 produces first water flow F1 from first space 18a toward second space 18b in filter member 50 by moving upon receiving external pressing force to apply a pressure to first space 18a. When pressing force is removed from moving member 20, coil spring 23 produces second water flow F2 from second space 18b toward first space 18a in filter member 50. Filter member 50 allows hydrogen ions to pass therethrough more easily than hydroxide ions. The power generation device generates electric power based on a potential difference between first space 18a and second space 18b when a water flow is produced in filter member 50.

Based on the results in Experiments 1 to 5, power generation device 1 configured as above can achieve an improved amount of generated power while using a water flow into a small-diameter flow path.

A system that generates electric power by using kinetic energy of a human body has recently been developed. A power generation system making use of any of electromagnetic induction, a piezoelectric effect, and electrostatic induction has been known as such a system. A vibration frequency at which electric power can efficiently be generated in the power generation system making use of any of electromagnetic induction, the piezoelectric effect, and electrostatic induction, however, is higher than a general vibration frequency in motions of the human body. Specifically, the vibration frequency at which electric power can efficiently be generated in the power generation system making use of any of electromagnetic induction, the piezoelectric effect, and electrostatic induction is equal to or higher than 10 Hz, whereas a general vibration frequency in motions of the human body is approximately equal to or lower than 1 Hz. Therefore, in the power generation system making use of any of electromagnetic induction, the piezoelectric effect, and electrostatic induction, kinetic energy of the human body cannot efficiently be converted to electric power.

According to the technology disclosed in NPL 1, even at a general vibration frequency in motions of a human body, electric power can efficiently be generated only while a pressure is applied to a flow path. NPL 1, however, is silent about an approach to efficient power generation by a flow of ions to a flow path by motions of the human body.

The present disclosure was made to solve also the problem above, and another object of the present disclosure is to provide a power generation device capable of efficiently converting kinetic energy of an object including a human body into electric power.

With the configuration according to the present embodiment, for example, as moving member 20 is moved upon receiving pressing force resulting from an operation of the human body, first water flow F1 is produced in filter member 50. Furthermore, second water flow F2 is produced in filter member 50 as pressing force is removed from moving member 20. Since filter member 50 allows hydrogen ions to pass therethrough more easily than hydroxide ions, with production of first water flow F1 in filter member 50, a concentration of hydroxide ions is higher in first space 18*a* and a concentration of hydrogen ions is higher in second space 18*b*. Consequently, a potential difference is produced between first space 18*a* and second space 18*b* and electric power based on the potential difference can be generated. Similarly, as second water flow F2 is produced in filter member 50, the concentration of hydrogen ions is higher in first space 18*a* and the concentration of hydroxide ions is higher in second space 18*b*. Consequently, a potential difference is produced between first space 18*a* and second space 18*b* and electric power based on the potential difference can be generated.

Throughout a period during which first water flow F1 or second water flow F2 is produced in filter member 50, power generation device 1 can generate electric power. Therefore, even though pressing force at a general vibration frequency in motions of the human body is applied to moving member 20, power generation device 1 can efficiently generate electric power. When pressing force is applied to moving member 20, first water flow F1 is generated in filter member 50, and when pressing force is removed from moving member 20, second water flow F2 is produced in filter member 50. Therefore, electric power can be generated as following repeated motions of the human body. Power generation device 1 can thus efficiently convert kinetic energy of an object including a human body into electric power.

instead of coil spring 23, a leaf spring, an elastic body such as rubber, a seesaw type mechanism, a packing member or a sealing member for hermetic sealing of members may be adopted as the biasing member.

Power generation device 1 further includes a Pt catalyst in each of first space 18*a* and second space 18*b*, the Pt catalyst accelerating reaction to generate water from hydrogen molecules and oxygen molecules. Thus, in first space 18*a* and second space 18*b*, hydrogen molecules ($H_2$) generated by reception of electrons by hydrogen ions and oxygen molecules ($O_2$) generated by release of electrons from hydroxide ions can return to water ($H_2O$). Consequently, even though power generation device 1 is used for a long time, container 10 does not have to be replenished with water. Other than Pt, copper and other various transition elements can be employed as a catalyst that accelerates reaction of hydrogen molecules and oxygen molecules to water.

Power generation device 1 further includes capacitors 33 and 43. Capacitor 33 serves as the first power storage that stores electric power in accordance with the potential difference between first space 18*a* and second space 18*b* when first water flow F1 is produced in filter member 50. Capacitor 43 serves as the second power storage that stores electric power in accordance with the potential difference between first space 18*a* and second space 18*b* when second water flow F2 is produced in filter member 50. Thus, even though a period during which first water flow F1 or second water flow F2 is continuously produced is short and power generation performance during that period is low, high electric power can be supplied to the outside from capacitors 33 and 34. A secondary battery or the like rather than capacitors 33 and 43 may be employed as the first power storage and the second power storage.

Filter member 50 is composed of porous glass. Filter member 50 may be composed of glass including a plurality of pores having a diameter not larger than 50 μm. Filter member 50 may be composed of glass including a plurality of pores having a diameter not larger than 1 μm.

Power generation device 1 further includes support (first support) 61 arranged on the side of first space 18*a* in filter member 50 and support (second support) 62 arranged on the side of second space 18*b* in filter member 50. Filter member 50 is sandwiched between support 61 and support 62. Break or the like of filter member 50 can thus be suppressed.

Electric power may be generated by power generation device 1A shown in FIG. 1. Alternatively, jig 100 shown in FIG. 10 may be employed as the power generation device. Based on the results in Experiments 1 to 6, power generation device 1A shown in FIG. 1 or the power generation device implemented by jig 100 shown in FIG. 10 can also achieve an improved amount of generated power while using a water flow into a small-diameter flow path.

In jig 100 shown in FIG. 10, piston 97 functions as the water flow production member that produces a water flow from an upper space (first space) in filter member 50*a* toward a lower space (second space) in filter member 50*a*. The water flow flows in the direction of thickness of filter member 50*a* in the form of the plate. When the jig shown in FIG. 10 is employed as the power generation device, a pump instead of piston 97 may be employed as the water flow production member.

Based on the results in Experiment 6, tap water or pure water (milli-Q water) may be used as water. When water containing a large amount of impurity is used, another filter member for removing the impurity in water may be arranged upstream of filter member 50 or 50a.

Figure 16:
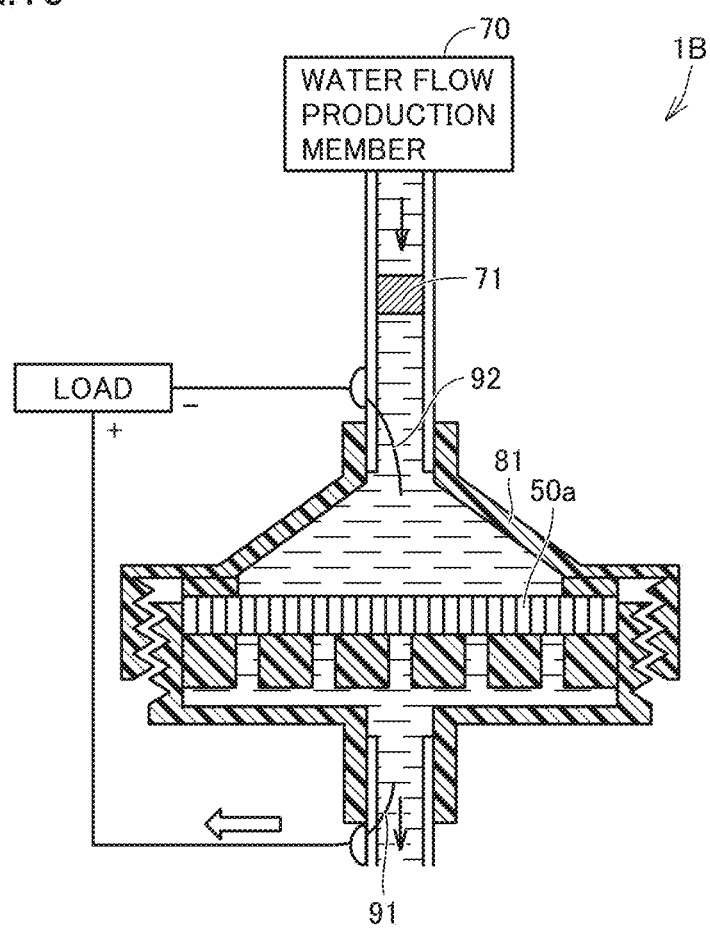
FIG. 16 is a diagram showing an exemplary power generation device according to a modification.

FIG. 16 is a diagram showing an exemplary power generation device according to a modification. A power generation device 1B shown in FIG. 16 is different from jig 100 shown in FIG. 10 in including a water flow production member 70 instead of base 94, syringe holder 95, syringe 96, piston 97, and lid 98 and further including a filter member 71.

Water flow production member 70 is a member that produces a water flow in the direction of thickness in filter member 50a and implemented by a pump or the like. For example, a pump provided in a public water pipe may serve as water flow production member 70. Alternatively, water flow production member 70 may be constituted of base 94, syringe holder 95, syringe 96, piston 97, and lid 98 as in FIG. 10.

Filter member 71 is arranged in a flow path upstream (on a side of the upper space) from filter member 50a and removes an impurity in water. Filter member 71 is implemented, for example, by a filter (a milli-Q filter) that can be attached to an ultrapure water purification apparatus manufactured by Merck Millipore, an activated carbon filter, or an ion exchange filter.

According to power generation device 1B in the example shown in FIG. 16, an impurity in water containing a large amount of impurity can be removed by filter member 71.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

INDUSTRIAL APPLICABILITY

The power generation device according to the present invention is an environmental power generation device driven by a water flow. Power generation can continue so long as water is available, and a current is obtained in accordance with a pressure even in a narrow area. The power generation device according to the present invention is a direct-current type hydroelectric power generation system. Direct-current electric power can be stored as it is in a capacitor or a storage battery, and the power generation device according to the present invention can widely generally be applied to electronic devices such as a portable telephone, a healthcare device, a care bed, a walking sensor, and a portable player.

REFERENCE SIGNS LIST 1, 1A, 1B power generation device; 10 container; 11 upper container; 12 lower container; 12a male thread; 13, 14 movable plate; 15 sealing member; 16 ring portion; 16a hollow space; 16b slit; 16c inner circumferential wall; 17 hanging-down portion; 17a female thread; 18 hermetically sealed space; 18a first space; 18b second space; 20 moving member; 23 coil spring; 30 first circuit; 31, 41, 91 positive electrode terminal; 32, 42 diode; 33, 43 capacitor; 34, 44, 92 negative electrode terminal; 40 second circuit; 50, 50a, 71 filter member; 51 flow path; 61, 62 support; 70 water flow production member; 80 conductive circuit; 81 filter holder; 93 measurement instrument; 94 base; 95 syringe holder; 96 syringe; 97 piston; 98 lid; 100 jig; A pressing force; F1 first water flow; F2 second water flow; I1, I2 current

The invention claimed is:

1. A power generation device comprising:
a container filled with water;
a filter member arranged between a first space and a second space in the container;
a moving member that is moved upon receiving external pressing force to apply a pressure to the first space and to produce a first water flow from the first space toward the second space in the filter member; and
a biasing member that produces a second water flow from the second space toward the first space in the filter member when the pressing force is removed from the moving member,
the filter member allowing hydrogen ions to pass through more easily than hydroxide ions,
the power generation device generating electric power based on a potential difference between the first space and the second space when the first water flow or the second water flow is produced in the filter member.

2. The power generation device according to claim 1, further comprising:
a first power storage that stores electric power in accordance with the potential difference between the first space and the second space when the first water flow is produced in the filter member; and
a second power storage that stores electric power in accordance with the potential difference between the first space and the second space when the second water flow is produced in the filter member.

3. The power generation device according to claim 1, further comprising a catalyst provided in each of the first space and the second space, the catalyst accelerating reaction to generate water from hydrogen molecules and oxygen molecules.

4. The power generation device according to claim 1, further comprising:
a first support arranged on a side of the first space in the filter member; and
a second support arranged on a side of the second space in the filter member, wherein
the filter member is sandwiched between the first support and the second support.

5. A power generation method by using a container filled with water, a filter member arranged between a first space and a second space in the container, and a moving member, the filter member allowing hydrogen ions to pass through more easily than hydroxide ions, the power generation method comprising:
producing a first water flow from the first space toward the second space in the filter member by moving the moving member upon receiving external pressing force to apply a pressure to the first space;
producing a second water flow from the second space toward the first space in the filter member by removing the pressing force from the moving member; and
generating electric power based on a potential difference between the first space and the second space when the first water flow or the second water flow is produced in the filter member.

* * * * *